United States Patent
Ugajin et al.

(10) Patent No.: US 11,168,948 B2
(45) Date of Patent: Nov. 9, 2021

(54) HEAT EXCHANGER, REFRIGERATION CYCLE APPARATUS, AND METHOD FOR MANUFACTURING HEAT EXCHANGER

(71) Applicant: Mitsubishi Electric Corporation, Tokyo (JP)

(72) Inventors: Yuki Ugajin, Tokyo (JP); Yusuke Adachi, Tokyo (JP); Hiroaki Makino, Tokyo (JP); Hiroshi Omura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 188 days.

(21) Appl. No.: 16/332,390

(22) PCT Filed: Nov. 28, 2016

(86) PCT No.: PCT/JP2016/085122
§ 371 (c)(1),
(2) Date: Mar. 12, 2019

(87) PCT Pub. No.: WO2018/096666
PCT Pub. Date: May 31, 2018

(65) Prior Publication Data
US 2020/0080795 A1   Mar. 12, 2020

(51) Int. Cl.
*F28F 1/32* (2006.01)
*B21D 53/08* (2006.01)
*F25B 39/00* (2006.01)

(52) U.S. Cl.
CPC .............. *F28F 1/325* (2013.01); *B21D 53/08* (2013.01); *F25B 39/00* (2013.01)

(58) Field of Classification Search
CPC ...... F28F 1/30; F28F 1/32; F28F 1/325; F28F 2215/02; F28F 2215/08; F28F 2215/12;
(Continued)

(56) References Cited

U.S. PATENT DOCUMENTS 5,174,366 A * 12/1992 Nagakura ............... F28F 1/325
165/77
5,564,495 A * 10/1996 Yoshihashi ............. F28F 1/32
165/122
(Continued)

FOREIGN PATENT DOCUMENTS

EP 0547450 A2 6/1993
JP H02-106228 A 4/1990
(Continued)

OTHER PUBLICATIONS

International Search Report of the International Searching Authority dated Feb. 28, 2017 for the corresponding International application No. PCT/JP2016/085122 (and English translation).
(Continued)

*Primary Examiner* — Jianying C Atkisson
*Assistant Examiner* — Jose O Class-Quinones
(74) *Attorney, Agent, or Firm* — Posz Law Group, PLC

(57) ABSTRACT

A heat exchanger includes a plurality of plate-shaped fins disposed at intervals, and a plurality of heat transfer tubes disposed to be inserted into through holes of the fins in a direction perpendicular to the fins. In each of the fins, a starting hole is formed between adjacent through holes, and the starting hole serves as a start point of bending of the fins and has a vertex portion at a bending portion of each fin which is close to an edge thereof. In each of the fins, a cut is made to connect the other edge of the fin and a side of the starting hole which is located opposite to the vertex portion of the starting hole. The above each fin is bent at the vertex portion of the starting hole, by opening the cut from the starting hole.

11 Claims, 9 Drawing Sheets

(58) Field of Classification Search
CPC .... B21D 53/08; B21D 53/085; B21D 53/022; F25B 39/00; F25B 39/02; F25B 39/04
See application file for complete search history.

(56) References Cited

U.S. PATENT DOCUMENTS

| | | | | |
|---|---|---|---|---|
| 5,573,059 | A * | 11/1996 | Hamamoto | F24F 1/0007 165/124 |
| 5,660,056 | A * | 8/1997 | Arai | F24F 1/0007 165/122 |
| 6,050,773 | A * | 4/2000 | Bushnell | F04D 17/04 415/53.1 |
| 7,013,961 | B2 * | 3/2006 | Song | F28D 1/0426 165/151 |
| 8,397,530 | B2 | 3/2013 | Kitazawa et al. | |
| 2009/0199585 | A1 * | 8/2009 | Ogawa | F28D 1/0477 62/324.2 |
| 2009/0321059 | A1 | 12/2009 | Kitazawa et al. | |
| 2016/0025415 | A1 * | 1/2016 | Ishikawa | F28D 1/047 165/148 |

FOREIGN PATENT DOCUMENTS

| | | |
|---|---|---|
| JP | H04-057073 U | 5/1992 |
| JP | H04-270892 A | 9/1992 |
| JP | H04-288420 A | 10/1992 |
| JP | H05-164347 A | 6/1993 |
| JP | H05-164348 A | 6/1993 |
| JP | H06-126544 A | 5/1994 |
| JP | H07-260181 A | 10/1995 |
| JP | H08-200719 A | 8/1996 |
| JP | H09-060906 A | 3/1997 |
| JP | H09-210585 A | 8/1997 |
| JP | H10-030894 A | 2/1998 |
| JP | H10-061962 A | 3/1998 |
| JP | 2008-025855 A | 2/2008 |
| JP | 2008-025856 A | 2/2008 |
| WO | 2014/125603 A1 | 8/2014 |

OTHER PUBLICATIONS

Office Action dated Sep. 18, 2020 issued in corresponding CN patent application No. 201680090930.8 (and Machine Translation).
Examination Report dated May 20, 2020 issued in corresponding IN patent application No. 201947018330.
Office Action dated Feb. 18, 2020 issued in corresponding JP patent application No. 2018-552363 (and English translation).
Office Action dated Mar. 27, 2020 issued in corresponding CN patent application No. 201680090930.8 (and English translation).
Decision of Rejection dated Jan. 12, 2021 issued in corresponding CN patent application No. 201680090930.8 (and Machine Translation).

* cited by examiner

WHETHER BENDING OF FIN IS POSSIBLE OR IMPOSSIBLE
(○: POSSIBLE ×: IMPOSSIBLE)

| THICKNESS μm OF FIN | 85 | 90 | 95 | 100 | 110 |
|---|---|---|---|---|---|
| ABSENCE OF STARTING HOLE | × | × | ○ | ○ | ○ |
| PRESENCE OF STARTING HOLE | × | ○ | ○ | ○ | ○ |

HEAT EXCHANGER, REFRIGERATION CYCLE APPARATUS, AND METHOD FOR MANUFACTURING HEAT EXCHANGER

CROSS REFERENCE TO RELATED APPLICATION

This application is a U.S. national stage application of PCT/JP2016/085122 filed on Nov. 28, 2016, the contents of which are incorporated herein by reference.

TECHNICAL FIELD

The present invention relates to a heat exchanger provided with bent fins, a refrigeration cycle apparatus, and a method for manufacturing the heat exchanger.

BACKGROUND ART

In conventional heat exchangers for use in air-conditioning apparatuses, especially, for use in indoor units of wall-mounted air-conditioning apparatuses, fins are bent because they are provided in a limited inner space of a housing.

As a method for bending the fins of the heat exchanger, Patent Literature 1 discloses a technique. In the technique of Patent Literature 1, cuts or notches are formed in fins included in a heat exchanger, to thereby bend the fins.

CITATION LIST

Patent Literature

Patent Literature 1: Japanese Unexamined Patent Application Publication No. 5-164347

SUMMARY OF INVENTION

Technical Problem

However, in the technique of Patent Literature 1, since tip portions of the cuts are rectangular, bending positions of the fins are not stable when the fins are bent in the process of manufacturing a heat exchanger. Thus, after bending of the fins, the accuracy of the dimensions and angle of the heat exchanger is low. Therefore, it is hard to produce heat exchangers with a high accuracy in dimension and angle, after bending of fins.

The present invention has been made to solve the above problems, and it is an object of the present invention to provide a heat exchanger provided with bent fins, that is produced with a high accuracy in dimension and angle, a refrigeration cycle apparatus, and a method for manufacturing the heat exchanger.

Solution to Problem

A heat exchanger according to an embodiment of the present invention includes: a plurality of plate-shaped fins disposed at intervals; and a plurality of heat transfer tubes inserted in through holes of the fins in a direction perpendicular to the fins, the fins each including a starting hole which is formed therethrough and located adjacent ones of the through holes of the each fin to serve as a start point of bending of the each fin and have a vertex portion at a bending portion of the each fin which is closer to an edge thereof, the each fin including a cut which is made to connect an other edge of the each fin and a side of the starting hole which is located opposite to the vertex portion of the starting hole, the each fin being bent at the vertex portion of the starting hole by opening the cut from the starting hole.

A refrigeration cycle apparatus according to another embodiment of the present invention includes a refrigerant cycle circuit in which a compressor, a condenser, an expansion device and an evaporator are sequentially connected by pipes. The above heat exchanger is used as the condenser or the evaporator.

A method for manufacturing a heat exchanger, according to still another embodiment of the present invention, the heat exchanger including a plurality of plate-shaped fins disposed at intervals, and a plurality of heat transfer tubes disposed to be inserted into through holes of the fins in a direction perpendicular to the fins, includes: a starting hole forming step of forming a starting hole between adjacent one of the through holes of each of the fins, the starting hole serving as a start point of bending of the each fin and having a vertex portion which has a minor angle at a bending portion of the each fin which is close to an edge thereof: a heat-exchanger prototype forming step of forming a heat-exchanger prototype in which the heat transfer tubes are fixed to the fins: a cut making step of making a cut in each of the fins of the heat-exchanger prototype, the cut connecting an other edge of the each fin and a side of the starting hole which is located opposite to the vertex portion of the starting hole: and a bending step of bending the each fin in which the cut is made, at the vertex portion of the starting hole, by opening the cut from the starting hole.

Advantageous Effects of Invention

According to the present invention, the fins are each bent at the vertex portion of the associated starting hole by opening the associated cut from the starting hole. For this reason, the position of the starting point at which each fin are bent is determined with respect to the vertex portion of the starting hole, and the fins are stably bent. Therefore, the heat exchanger provided with bent fins is formed in dimension and angle with a high accuracy.

DESCRIPTION OF EMBODIMENTS

Embodiments of the present invention will be described as appropriate with reference to the drawings. In the following drawings including FIG. 1, the relationship in size between the components may differ from that between actual ones. In each figure in the following drawings including in FIG. 1, elements which are same as or equivalent to those illustrated in a previous figure are denoted by the same signs. The same is true of the full text of the specification. Furthermore, the forms of components described in the full text of the specification are merely examples, and the forms are not limited to those described in the text.

Embodiment 1

[Configuration of Heat Exchanger]

Figure 1:
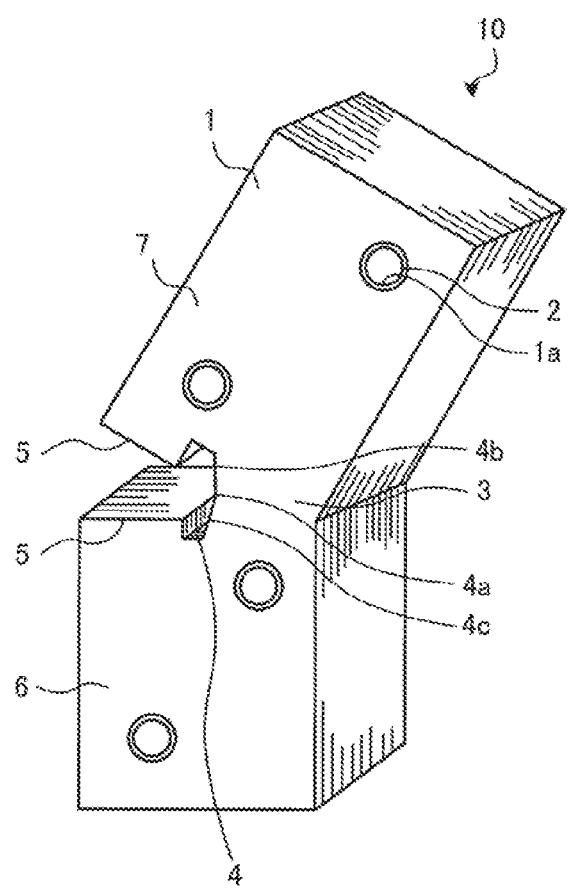
FIG. 1 is a schematic diagram illustrating a heat exchanger according to embodiment 1 of the present invention.

FIG. 1 is a schematic diagram showing a heat exchanger 10 according to embodiment 1 of the present invention.

The heat exchanger 10 as illustrated in FIG. 1 includes a plurality of plate-shaped fins 1 arranged in parallel at intervals. The heat exchanger 10 includes heat transfer tubes 2 which are inserted into through holes 1a of the fins 1 in a direction perpendicular to the plurality of fins 1.

The fins 1 are each formed of a plate material which is rectangular and bent. In each of the fins 1, a single starting hole 4 is formed between adjacent through holes 1a. The starting hole 4 serves as a start point of bending of each fin 1, and has a vertex portion 4a at a bending portion 3 close to a rear edge of each fin 1, which is the right one of edge sides thereof as seen in the figure. The starting hole 4 is provided at a position where each fin 1 is bent. The starting hole 4 is formed through each fin 1. The starting hole 4 is located in such a way as to avoid the adjacent through holes 1a, and is also continuous with a cut 5. The vertex portion 4a of the starting hole 4 is the vertex of boundaries 4b and 4c which form a minor angle α on a rear edge side of the starting hole 4.

In each fin 1, the cut 5 is made to connect a boundary 4d which is located opposite to the vertex portion 4a of the starting hole 4, and a front edge of each fin 1, which is located on the left side as seen in the figure. The cut 5 of the fin 1 gradually broadens from the starting hole 4 toward the front edge of the fin 1.

The fin 1 is bent at the vertex portion 4a of the starting hole 4 by opening and widening the cut 5 from the starting hole 4. To be more specific, in the heat exchanger 10, an upper half 7 is inclined obliquely rearwards with respect to a lower half 6.

[Method for Manufacturing Heat Exchanger 10]

Figure 2:
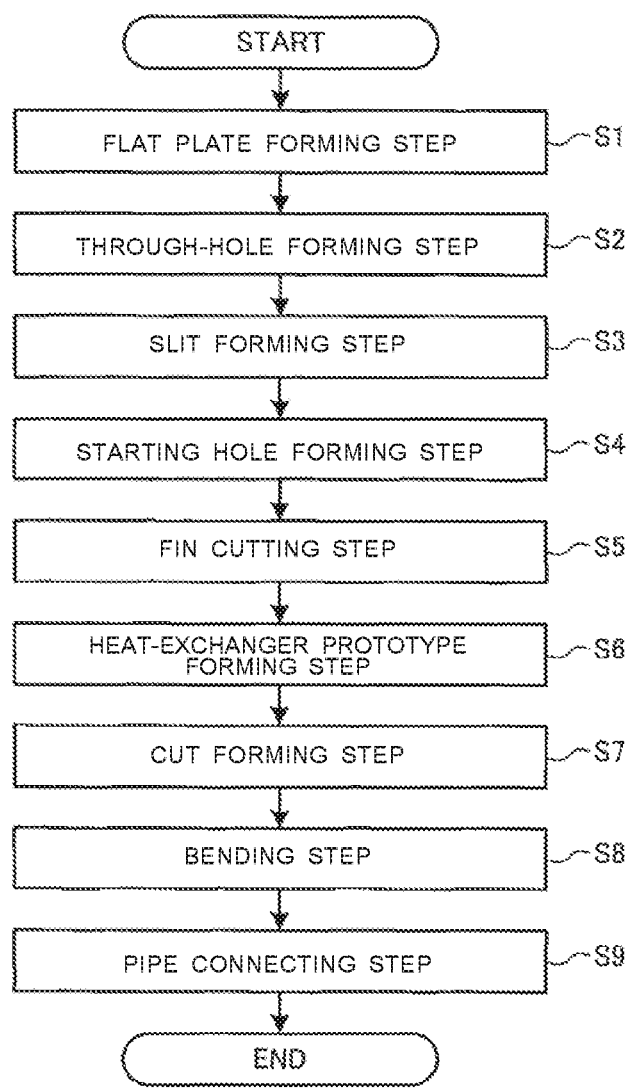
FIG. 2 is a process chart indicating a method for manufacturing the heat exchanger according to embodiment 1 of the present invention.

FIG. 2 is a process chart indicating a method for manufacturing the heat exchanger 10 according to embodiment 1 of the present invention. As indicated in FIG. 2, the method for manufacturing the heat exchanger 10 includes the following steps.

In step S1, as a flat plate forming step, a plate-shaped aluminum roll is extended to form an aluminum flat plate corresponding to a single fin 1.

In step S2, as a through-hole forming step, through holes 1a are formed in the aluminum flat plate corresponding to the single fin 1, and fin collars (not illustrated) are formed, the through holes 1a being provided to allow the heat transfer tubes 2 to be passed therethrough.

In step S3, as a slit forming step, slits (not illustrated) are formed in the aluminum flat plate corresponding to the single fin 1 by press working.

Figure 3A:
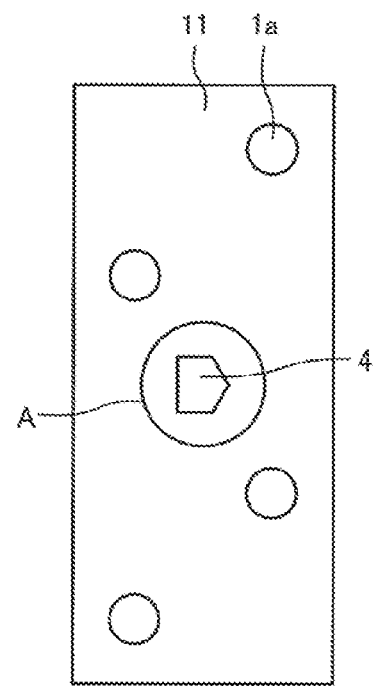
FIG. 3A is a schematic view illustrating a fin prototype according to embodiment 1 of the present invention.
Figure 3B:
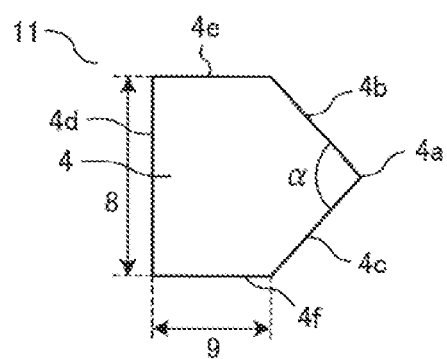
FIG. 3B is an enlarged schematic view of a portion A in FIG. 3A illustrating a starting hole of the fin prototype according to embodiment 1 of the present invention.

FIG. 3A is a schematic diagram illustrating a fin prototype 11 according to embodiment 1 of the present invention. FIG. 3B is an enlarged schematic view of a portion A in FIG. 3A illustrating a starting hole 4 formed in the fin prototype 11 according to embodiment 1 of the present invention.

In step S4, as illustrated in FIG. 3A, in the starting hole forming step, a starting hole 4 is punched out in the aluminum flat plate corresponding to the single fin 1, thereby forming a fin prototype 11. To be more specific, in the starting hole forming step, in the single fin 1 or the aluminum flat plate corresponding to the single fin 1, a starting hole 4 is provided between adjacent through holes 1a. The starting hole 4 serves as the starting point of bending of the fin 1 and has a vertex portion 4a which has a minor angle α at a bending portion 3 close to the rear edge of the fin 1, which is located on the right side as seen in the figure. The following description contains descriptions in which the fin prototype 11 is referred to as the fin 1 in order that the fin prototype 11 be simply described.

As illustrated in FIGS. 3A and 3B, between adjacent through holes 1a, the starting hole 4 is formed to serve as the starting point of bending of the fin 1, and have a vertex portion 4a at the bending portion 3 which is close to the rear edge of the fin 1. The starting hole 4 has boundaries 4b and 4c that form the minor angle α in the direction from the vertex portion 4a toward the front edge of the fin 1.

The starting hole 4 has a displacement allowable width 8 which is set to allow displacement of cuts 5 in the longitudinal direction of the fin 1 which is perpendicular to a direction along the short side of the fin 1, which is the extending direction of the cut 5. Also, the starting hole 4 has a depth-variation allowable width 9 which is set to allow variation between the depths of cuts 5, that is, the lengths thereof in the direction along the short side of the fin 1, that is the extending direction of the cut 5.

As a side of a region having the displacement allowable width 8 and the depth-variation allowable width 9, the starting hole 4 has a boundary 4d which is opposite to the vertex portion 4a and the bending portion 3 of the fin 1, such the boundary 4d is provided in a straight line perpendicular to the extending direction of the cut 5. The straight line of the boundary 4d has the displacement allowable width 8.

Furthermore, as sides of the region having the displacement allowable width 8 and the depth-variation allowable width 9, the starting hole 4 have boundaries 4e and 4f which connect both ends of the boundary 4d having the displacement allowable width 8 and front ends of the boundaries 4b and 4c, such that the boundaries 4e and 4f are provided in straight lines along the extending direction of the cut 5. The straight lines of the boundaries 4e and 4f have the depth-variation allowable width 9.

That is, the starting hole 4 is a hole surrounded by the boundaries 4b and 4c; which respectively extend obliquely upward and obliquely downward from the vertex portion 4a located close to the rear edge of the fin 1 toward the front edge of the fin 1 so as to form the minor angle α which is smaller than 180 degrees; the boundaries 4e and 4f provided in upper and lower straight lines, respectively, which extend in the direction along the short side of the fin 1 by the displacement allowable width 8 from the front ends of the boundaries 4b and 4c extending obliquely upward and obliquely downward; and the boundary 4d, which connects the upper and lower boundaries 4e and 4f and is provided in a straight line extending in the longitudinal direction of the fin 1.

The starting hole 4 is formed in the shape of, for example, a pentagon similar to a home base. It should be noted that the starting hole 4 can be formed in another shape which varies in accordance with the arrangement of the plurality of through holes 1a formed in the fin 1.

In step S5, as a fin cutting step, the aluminum flat plate of the fin prototype 11 is cut to provide fins 1.

In step S6, as a heat-exchanger prototype forming step, a plurality of fins 1 are arranged, and heat transfer tubes 2 are passed through the through holes 1a, and are then expanded and subjected to caulking to form a heat-exchanger prototype 20. That is, in the heat-exchanger prototype forming step, a heat-exchanger prototype 20 in which the heat transfer tubes 2 are fixed to the plurality of fins 1 is formed.

Figure 4:
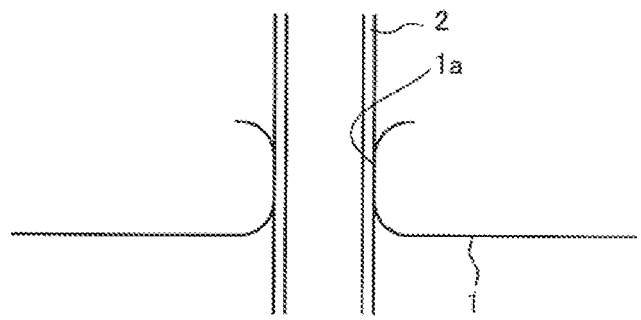
FIG. 4 is an explanatory view illustrating a state in which a heat transfer tube is fixed to a fin in the heat-exchanger prototype according to embodiment 1 of the present invention.

FIG. 4 is an explanatory view illustrating a state where the heat transfer tube 2 is fixed to the fin 1 in the heat-exchanger prototype 20 in embodiment 1 of the present invention.

As illustrated in FIG. 4, the heat transfer tube 2 is inserted into the through hole 1a of the fin 1, expanded and subjected to caulking. Thereby, the expanded heat transfer tube 2 comes into contact with a portion of the fin 1 that becomes a fin collar, and the fin 1 and the heat transfer tube 2 are fixed to each other.

Figure 5:
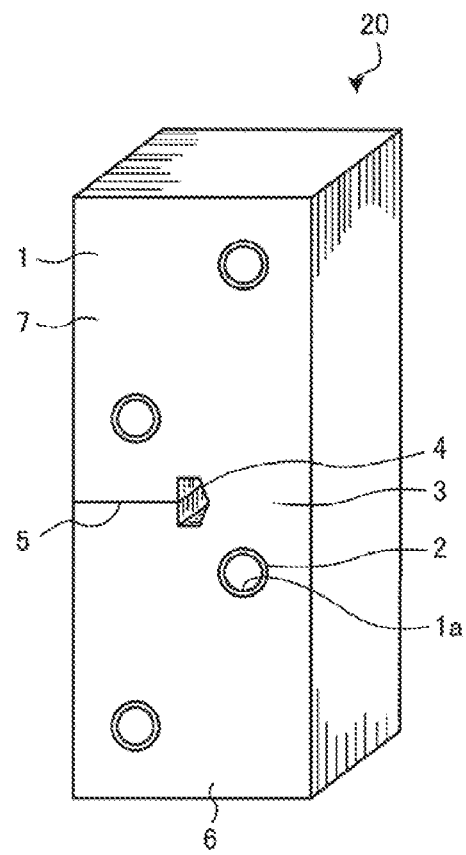
FIG. 5 is a schematic view showing a state in which a cut is made in the heat-exchanger prototype according to embodiment 1 of the present invention.

FIG. 5 is a schematic view illustrating a state in which a cut 5 is made in the heat-exchanger prototype 20 in embodiment 1 of the present invention.

In step S7, as illustrated in FIG. 5, as a cut making step, a blade is passed through the plurality of fins 1 of the heat-exchanger prototype 20 to make cuts 5 in all the fins 1. That is, in the cut making step, cuts 5 are made in the plurality of fins 1 of the heat-exchanger prototype 20 such that each of the cuts 5 connects the boundary 4d of an associated one of the fins 1, that is located opposite to the vertex portion 4a of an associated one of starting holes 4 formed through the fins 1, and the front edge of the associated fin 1, which is located on the left side as seen in the figure. The cuts 5 extend in the direction along the short side of each of the fins 1. The cuts 5 may be made to extend in an oblique direction, not the direction along the short side of each of the fins 1.

It should be noted that in the case of heat exchangers 10 are mass-produced, the positions of cuts 5 made in the cut making step corresponding to step S7 vary.

However, each of the starting holes 4 is formed to have the displacement allowable width 8 in the longitudinal direction of the fin 1. Therefore, even if the positions of the cuts 5 made in the cut making step varies in the longitudinal direction of the fin 1, that is, a vertical direction as illustrated in the figure, it does not cause production of defectives, and the yield of produced heat exchangers can thus be improved.

Also, each of the starting holes 4 has the depth-variation allowable width 9 in the direction along the short side of the fin 1. Therefore, even if the lengths of the cuts 5 made in the cut making step vary in the direction along the short side of the fin 1, that is, each of them is too short or too long leftwards or rightwards in the direction along the short side of the fin 1, it does not cause production of defectives, and the yield of produced heat exchangers can thus be improved.

In step S8, as illustrated in FIG. 1, as a bending step, the fin 1 in which the cut 5 is made is bent at the vertex portion 4a of the starting hole 4, by opening the cut 5 from the starting hole 4.

By dividing the fin 1 from the cut 5 into the upper half 7 and the lower half 6, the heat-exchanger prototype 20 is bent. At this time, the position of the above bending is determined with respect to the vertex portion 4a which corresponds to the vertex of the boundaries 4b and 4c which form the minor angle α at the rear edge side end of the starting hole 4, and the bending can be stably performed because of the provision of the vertex portion 4a. Therefore, the heat exchanger 10 can be formed in dimension with a high accuracy.

In step S9, as a pipe connecting step, pipes (not illustrated) are connected and brazed to the heat transfer tubes 2 of the heat exchanger 10.

As a result, the heat exchanger 10 is completely produced.

[Thickness of Fin 1]

Figures 6, 7:
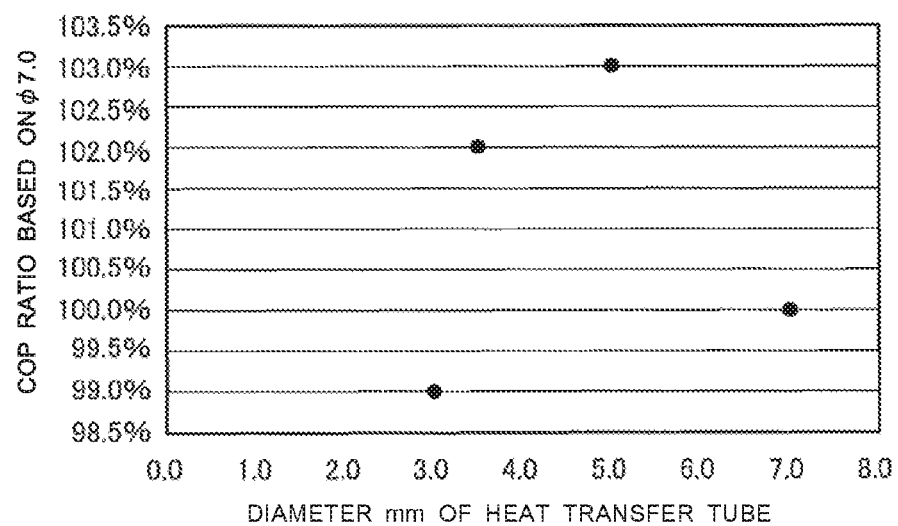
FIG. 6 is a view indicating a relationship between the thickness of the fin and the bending strength of the fin in embodiment 1 of the present invention.
FIG. 7 is a view indicating a range of an outside diameter of a heat transfer tube in embodiment 1 of the present invention.

FIG. 6 is a diagram indicating the relationship between the thickness of the fin 1 and the bending strength of the fin 1 in embodiment 1 of the present invention.

The fins 1 are each formed to have a thickness which falls within the range of 90 μm to 110 μm. It should be noted that the smaller the thickness of the fin 1, the lower the strength of the fin 1, and the more easily the fin 1 are broken when the fin 1 is bent. As illustrated in FIG. 5, the fin 1 is formed to include the starting hole 4, and thus even if the formed fin 1 has a thickness of 90 μm, it can be bent. Furthermore, the thickness of the fin 1 is 110 μm or less. It thus does not cause a problem that the fin 1 is too thick, the fin strength is too high, and the fin 1 cannot be bent.

[Range of Outer Diameter of Heat Transfer Tube 2]

FIG. 7 is a diagram indicating the range of the outer diameter of the heat transfer tubes 2 in embodiment 1 of the present invention.

In the heat exchanger 10, in order to promote heat transfer, slits are formed to be raised between the through holes 1a in each of the fins 1, and each of the heat transfer tubes 2 is made to have a smaller diameter.

As indicated in FIG. 7, the outer diameter of each of the heat transfer tubes 2 is set to fall within the range of 3.5 mm to 7.0 mm in order to improve the performance.

The outer diameter of each heat transfer tube 2 is 3.5 mm or more. It should be noted that in the case where each heat transfer tube 2 is made to have a smaller diameter, the area of each heat transfer tube 2 is decreased. Therefore, in order to secure an appropriate area of each heat transfer tube 2, it is necessary to reduce the pitch of adjacent heat transfer tubes 2 and the width of each of the slits which are formed to extend in the longitudinal direction of the fins 1. Therefore, in order to secure an appropriate area of the slits, the number of slits formed to be raised in the direction along the short side of each fink 1 is increased. On the other hand, since the bending position of each of the fins 1 is determined with respect to the starting hole 4 and the cut 5 during mass production of the heat exchanger 10, the slits formed to be raised at the time of bending the fins 1 are not deformed. Thus, the degree of freedom of the position where the slits formed in the fin 1 are raised can be improved. Furthermore, the outer diameters of the heat transfer tubes 2 are 7.0 mm or less. It is therefore possible to reduce deterioration of heat transfer between the fins 1 and the refrigerant in the heat transfer tubes 2, which would occur if the heat transfer tubes 2 were made to have a great diameter, and the efficiency of heat transfer between the fins 1 and the refrigerant in the heat transfer tubes 2 can be improved.

Modification 1 of Embodiment 1

Figure 8:
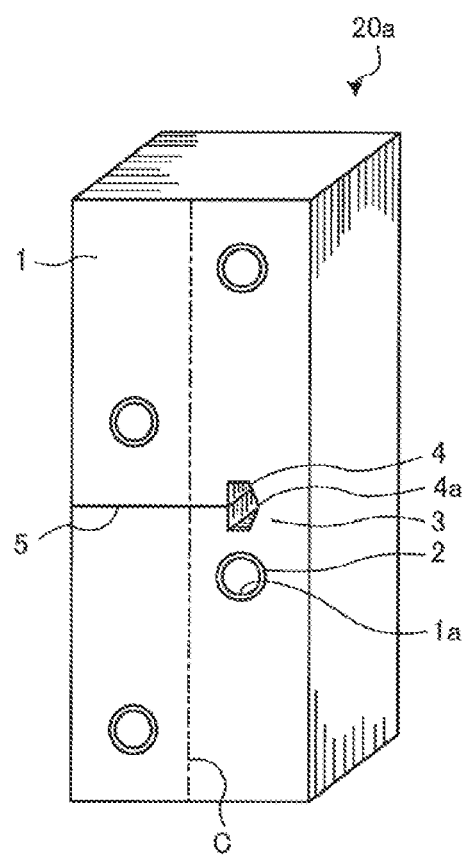
FIG. 8 is a schematic view showing a state in which a cut is made in a heat-exchanger prototype according to a first modification of embodiment 1 of the present invention.
Figure 9:
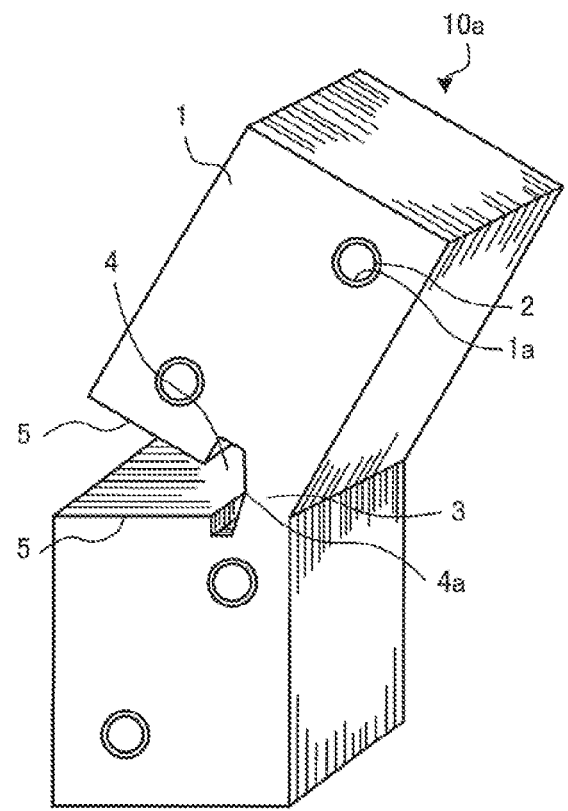
FIG. 9 is a schematic diagram showing a heat exchanger according to a first modification of embodiment 1 of the present invention.

FIG. 8 is a schematic diagram illustrating a state in which a cut 5 is made in a heat-exchanger prototype 20a in modification 1 of embodiment 1 of the present invention. FIG. 9 is a schematic diagram illustrating a heat exchanger 10a according to modification 1 of embodiment 1 of the present invention. The difference between modification 1 and embodiment 1 will be described with reference to FIGS. 8 and 9.

As in embodiment 1, a starting hole 4 and a cut 5 are made in each fin 1. As illustrated in FIG. 8, the starting hole 4 is located on a rear side of the fin 1 where the bending portion 3 is located, with respect to a center line C of the fin 1 which is perpendicular to the direction along the short side of the fin 1, that is, a direction in which an extension of the cut 5 extends to pass through the vertex portion 4a.

As illustrated in FIG. 9, since the vertex portion 4a of the starting hole 4 is located on the rear side of the fin 1 with respect to the center line C of the fin 1 which is perpendicular to the direction along the short side of the fin 1, a bending width of the bending portion 3 is small, and the bending of the fins 1 can be performed with a high accuracy. In addition, the amount of deformation of the fin 1 at the bending portion 3 is reduced, and it is therefore possible to reduce dripping of dew from the bending portion 3 when the heat exchanger 10a is in operation.

Modification 2 of Embodiment 1

Figure 10:
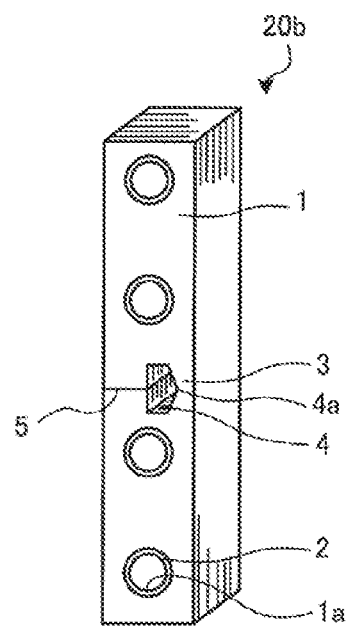
FIG. 10 is a schematic view showing a state in which a cut is made in a heat-exchanger prototype according to a second modification of embodiment 1 of the present invention.
Figure 11:
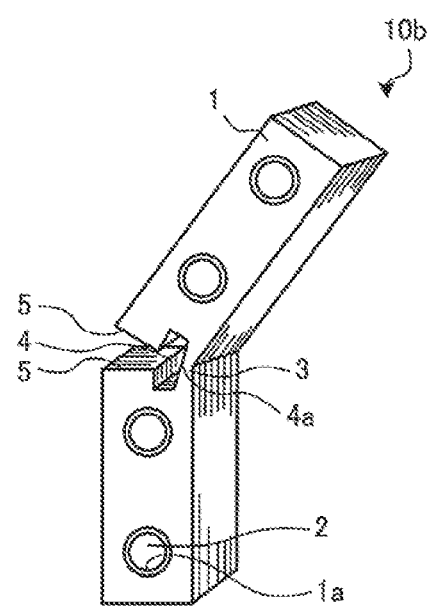
FIG. 11 is a schematic diagram showing a heat exchanger according to a second modification of embodiment 1 of the present invention.

FIG. 10 is a schematic diagram illustrating a state in which a cut 5 is made in a heat-exchanger prototype 20b in modification 2 of embodiment 1 of the present invention. FIG. 11 is a schematic diagram illustrating a heat exchanger 10b according to modification 2 of embodiment 1 of the present invention. The difference between modification 2 and embodiment 1 will be described with reference to FIGS. 10 and 11.

Unlike embodiment 1, the heat transfer tubes 2 are arranged in line in the longitudinal direction of the fins 1, which is perpendicular to the direction along the short side of each of the fins 1, that is, the extending direction of the cut 5.

In the case where the heat transfer tubes 2 are arranged in line in the longitudinal direction of the fins 1, which is perpendicular to the direction along the short side of each of the fins 1, that is, the extending direction of the cuts 5, the fin strength is lowered, and the fins 1 are thus easily broken when they are bent. However, as in embodiment 1, since the starting hole 4 and the cuts 5 are made, even if the heat transfer tubes 2 are arranged in line in the longitudinal direction of the fins 1 which is perpendicular to the direction along the short sides of the fins 1, that is, the extending direction of the cut 5, the fins 1 can be bent without being broken.

Advantages of Embodiment 1

According to embodiment 1 and the modifications thereof, the heat exchangers 10, 10a and 10b each include a plurality of plate-shaped fins 1 arranged at intervals. The heat exchangers 10, 10a and 10b include heat transfer tubes 2 which are inserted into the through holes 1a of the fins 1 in the direction perpendicular to the fins 1. In each of the fins 1, the starting hole 4 is formed between adjacent through holes 1a, serves as the start point of bending of the fin 1, and has the vertex portion 4a at the bending portion 3 close to the rear edge of the fin 1, which is located on the right side as seen in the figure. In each fin 1, the cut 5 is made to connect the boundary 4d, which is located opposite to the vertex portion 4a of the starting hole 4, and the front edge of the fin 1, which is located on the left side as seen in the figure. The fin 1 is shaped such that it is bent at the vertex portion 4a of the starting hole 4, by opening the cut 5 from the starting hole 4.

In this configuration, the starting point at which each of the fins 1 is bent is determined with respect to the vertex portion 4a of the associated starting hole 4, and the fins 1 are stably bent. Therefore, the heat exchangers 10, 10a and 10b in which the fins 1 are bent are formed in dimension and angle with a high accuracy.

According to embodiment 1, each of the starting holes 4 has a displacement allowable width 8 which is set to allow displacement of the cuts 5 in the direction perpendicular to the extending direction of the cuts 5.

In this configuration, because of the displacement allowable width 8 of the starting hole 4, even if displacement of cuts 5 occurs in the direction perpendicular to the extending direction of the cuts 5 when the cuts 5 are made, the cuts 5 can be formed such that their displacement is allowed. Therefore, even if the positions of made cuts 5 vary, such variation is allowed. It is therefore possible to improve the yield of heat exchangers 10, 10a and 10b.

According to embodiment 1, the starting holes 4 each have a depth-variation allowable width 9 which is set to allow variation between the depths of cuts 5, that is, the lengths thereof in the extending direction of the cuts 5.

In this configuration, each starting hole 4 is provided with the depth-variation allowable width 9, and even if variation between the depths of the cuts 5, that is, the lengths of the cuts 5 in the extending direction of the cuts 5, occurs when the cut 5 is made, the cuts 5 can be formed such that such variation is allowed. Therefore, even if the depths of formed cuts 5 vary, such variation is allowed. It s therefore possible to improve the yield of heat exchangers 10, 10a and 10b.

According to embodiment 1, in each of the fins 1, as a side of the region having the displacement allowable width 8 and the depth-variation allowable width 9, the starting hole 4 has the boundary 4d which is located opposite to the bending portion 3 of the fin 1 and the vertex portion 4a, and which is located in a straight line perpendicular to the extending direction of the cut 5 of the fin 1. Furthermore, as sides of the region having the displacement allowable width 8 and the depth-variation allowable width 9, the starting hole 4 has boundaries 4e and 4f which extend by the displacement allowable width 8, and which are located in straight lines extending along the extending direction of the cut 5.

In this configuration, the starting hole 4 e has the boundaries 4d, 4e and 4f of the region having the displacement allowable width 8 and the depth-variation allowable width 9. Thus, even if such displacement and variation as described above occur when cuts 5 are made, the cuts 5 can be made such that the displacement and variation are allowed. Therefore, even if the positions and depths of the made cuts 5 vary, such variations can be allowed. It is therefore possible to improve the yield of heat exchangers 10, 10a and 10b.

According to embodiment 1, the vertex portion 4a is located closer to the bending portion 3 than the center line C of the fin 1, which is perpendicular to the extending direction of the cut 5.

In this configuration, the bending width of the bending portion 3 is small, and the bending of the fin 1 can be performed with a high accuracy. In addition, the amount of deformation of the fin 1 at the bending portion 3 is small, as a result of which it is possible to reduce dripping of dew from the bending portion 3 when the heat exchanger 10a is in operation.

According to embodiment 1, the fins 1 are each formed to have a thickness which falls within the range of 90 μm to 110 μm.

In this configuration, the thickness of each of the fins 1 is 90 μm or more. It should be noted that the smaller the thickness of each fin 1, the lower the strength thereof, and the more easily each fin 1 is broken when it is bent. However, since the thickness of each of the fins 1 is 90 μm or more, the fins 1 can be bent without being broken. Further, since the thickness of each of the fins 1 is 110 μm or less, it does not cause a problem in which the fins 1 are too thick, their strength is too strong, and the fins 1 cannot be bent.

According to embodiment 1, the heat transfer tubes 2 are arranged in line in a direction perpendicular to the extending direction of the cuts 5.

In this configuration, the heat transfer tubes 2 are arranged in line in a direction perpendicular to the extending direction of the cuts. In the case where the heat transfer tubes 2 are arranged in line in a direction perpendicular to the extending direction of the cuts 5, the strengths of the fins 1 are lowered, and the fins 1 are thus easily broken when the fins 1 are bent. However, in the modification, the starting holes 4 and the cuts 5 are formed, as a result of which though the heat transfer tubes 2 are arranged in line in a direction perpendicular to the extending direction of the cuts 5, the fins 1 can be bent without being broken.

According to embodiment 1, the heat exchanger tubes 2 have an outer diameter which falls within the range of 3.5 mm to 7.0 mm.

In this configuration, the outer diameter of the heat transfer tubes 2 is 3.5 mm or more. It should be noted that the area of the heat transfer tubes decreases as the diameter of the heat transfer tubes 2 decreases. Therefore, in order to secure an appropriate area of the heat transfer tubes, it is necessary to reduce the interval between adjacent ones of the heat transfer tubes 2. If it is reduced, the widths of the slits formed in the longitudinal direction of each fin 1 are also reduced. Therefore, in order to secure an appropriate slit area, the number of slits formed to be raised in the direction along the short side of the fin 1 is increased. On the other hand, since the bending position of the fin 1 is determined with respect to the starting hole 4 and the cut 5 during mass production of heat exchangers 10, 10a and 10b, the slits formed to be raised are not deformed at the time of bending the fin 1. Thus, the position where the slits formed in the fin 1 are raised has a higher degree of flexibility. Further, it should be noted that the outer diameter of each of the heat transfer tubes 2 is 7.0 mm or less. Therefore, deterioration of heat transfer between the fin 1 and the refrigerant in the heat transfer tubes 2, which would occur if they were made to have a large diameter, can be reduced, and the efficiency of heat transfer between the fins 1 and the refrigerant in the heat transfer tubes 2 can be improved.

According to embodiment 1, the heat exchangers 10, 10a and 10b each include a plurality of plate-shaped fins 1 arranged at intervals. The heat exchangers 10, 10a and 10b each include heat transfer tubes 2 which are inserted into the through holes 1a of the fins 1 in the direction perpendicular to the fins 1. A method for manufacturing such heat exchanger 10, 10a or 10b includes the following steps. The method for manufacturing the heat exchanger 10, 10a or 10b includes a starting hole forming step (step S4) of forming, in each of fins 1, a starting hole 4 between adjacent through holes 1a, the starting hole 4 serving as the start point of bending of the fin 1, and having a vertex portion 4a which has a minor angle α at a bending portion 3 close to a rear edge of the fin 1, which is located on the right side as seen in the figure. The method for manufacturing the heat exchanger 10, 10a or 10b includes a heat-exchanger prototype forming step (step S6) of forming a heat-exchanger prototype 20, 20a or 20b in which the heat transfer tubes 2 are fixed to the plurality of fins 1. The method for manufacturing the heat exchanger 1, 10a or 10b includes a cut making step (step S7) of making a cut 5 in the fins 1 of the heat-exchanger prototype 20, 20a or 20b, the cut 5 connecting a boundary 4d which is located opposite to the vertex portion 4a of the starting hole 4 and a front edge of the fin 1, which is located on the left side as seen in the figure. The method for manufacturing the heat exchanger 10, 10a or 10b includes a bending step (step S8) of bending each of the fins 1 in which the cut 5 is made, at the vertex portion 4a of the starting hole 4, by opening the cut 5 from the starting hole.

In the above configuration, the position of the starting point of bending of the fins 1 is determined with respect to the vertex portion 4a of the starting hole 4, and the fins 1 are stably bent. Therefore, the heat exchangers 10, 10a and 10b in which the fins 1 are bent are formed in dimension and angle with a high accuracy.

Furthermore, in the above method, the cut making step (step S7) is subsequent to the heat-exchanger prototype forming step (step S6) of forming the heat-exchanger prototype 20, 20a or 20b. It is therefore possible to prevent deformation of the fins at the time of manufacturing them, which would occur since their strength would be lowered by cuts if each of the fins is subjected to press-processing after the cut is made in each fin, or if the heat transfer tubes are fixed to the fins by caulking to form a heat-exchange prototype after the cut is made in each fin. In the cut making step (step S1), cuts 5 are made in the fins 1 all at once. Thereby, the heat exchangers 10, 10a and 10b can be more easily manufactured, thus improving the manufacturing efficiency.

Embodiment 2

Figure 12:
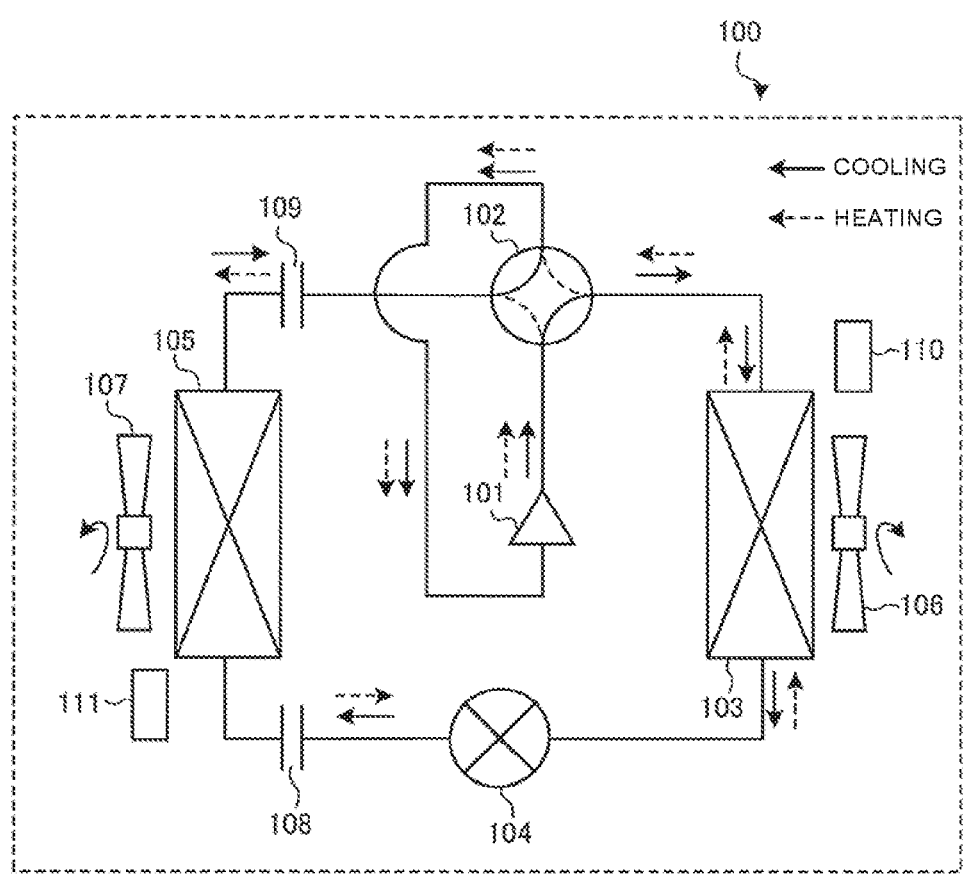
FIG. 12 is a schematic configuration diagram illustrating an air conditioner according to embodiment 2 of the present invention.

FIG. 12 is a schematic configuration diagram illustrating an air-conditioning apparatus 100 according to embodiment 2 of the present invention. In FIG. 12, the flow of refrigerant during the cooling operation is indicated by solid arrows, and the flow of refrigerant during the heating operation is indicated by dotted arrows.

[Configuration of Air-Conditioning Apparatus]

As illustrated in FIG. 12, the air-conditioning apparatus 100 includes a compressor 101, a four-way valve 102, a heat-source-side heat exchanger 103, an expansion device 104 and a load-side heat exchanger 105. The air-conditioning apparatus 100 includes a heat-source-side fan 106 which sends air to the heat-source-side heat exchanger 103 and a load-side fan 107 which sends air to the load-side heat exchanger 105. The air-conditioning apparatus 100 includes pipes 108 and 109 which connect the indoor unit and the outdoor unit. The air-conditioning apparatus 100 includes controllers 110 and 111 which control various movable components of the air-conditioning apparatus 100.

In the air-conditioning apparatus 100, the compressor 101, the four-way valve 102, the heat-source-side heat exchanger 103, the expansion device 104 and the load-side heat exchanger 105 are connected by refrigerant pipes, whereby a refrigerant cycle circuit is formed.

The controllers 110 and 111 are connected to, for example, the compressor 101, the four-way valve 102, the expansion device 104, the heat-source-side fan 106, the load-side fan 107 and various sensors by communication lines.

The controllers 110 and 111 perform switching between flow passages of the four-way valve 102, thereby switching the operation to be applied, between the cooling operation and the heating operation. The heat-source-side heat exchanger 103 functions as a condenser during the cooling operation, and functions as an evaporator during the heating operation. The load-side heat exchanger 105 functions as an evaporator during the cooling operation, and functions as a condenser during the heating operation.

[Flow of Refrigerant During Cooling Operation]

High-pressure and high-temperature gas refrigerant discharged from the compressor 101 flows into the heat-source-side heat exchanger 103 via the four-way valve 102. The refrigerant having flowed into the heat-source-side heat exchanger 103 is condensed by heat exchange with outdoor air sent by the heat-source-side fan 106 to change into high-pressure liquid refrigerant, and then flows out of the heat-source-side heat exchanger 103. The high pressure liquid refrigerant having flowed out of the heat-source-side heat exchanger 103 flows into the expansion device 104, and is changed into low-pressure two-phase gas-liquid refrigerant. After the expansion device 104, the low-pressure two-phase gas-liquid refrigerant flows into the load-side heat exchanger 105, is evaporated by heat exchange with indoor air sent by the load-side fan 107 to change into low-pressure gas refrigerant, and then flows out of the load-side heat exchanger 105. The low-pressure gas refrigerant having flowed out of the load-side heat exchanger 105 is sucked into the compressor 101 via the four-way valve 102.

[Flow of Refrigerant During Heating Operation]

High-pressure and high-temperature gas refrigerant discharged from the compressor 101 flows into the load-side heat exchanger 105 via the four-way valve 102. The refrigerant having flowed into the load-side heat exchanger 105 is condensed by heat exchange with indoor air sent by the load-side fan 107 to change into high-pressure liquid refrigerant, and then flows out of the load-side heat exchanger 105. The high-pressure liquid refrigerant having flowed out of the load-side heat exchanger 105 flows into the expansion device 104, and is changed into low-pressure two-phase gas-liquid refrigerant. The low-pressure two-phase gas-liquid refrigerant having flowed out of the expansion device 104 flows into the heat-source-side heat exchanger 103, is evaporated by heat exchange with outdoor air sent by the heat-source-side fan 106 to change into low-pressure gas refrigerant, and then flows out of the heat-source-side heat exchanger 103. The low pressure gas state refrigerant having flowed out of the heat-source-side heat exchanger 103 is sucked into the compressor 101 via the four-way valve 102.

By using each of the heat exchanger 10, 10a and 10b according to embodiment 1 as the load-side heat exchanger 105, it is possible to obtain the following advantages: the dimensions and angle of the heat exchanger are accurate; and a high-performance air-conditioning apparatus 100 can be obtained.

With respect to embodiment 2, the air-conditioning apparatus 100 is described above as an example of a refrigeration cycle apparatus. The present invention is not limited to this. Any refrigeration cycle apparatus can be used as the refrigeration cycle apparatus of the present invention as long as it uses the heat exchanger 10, 10a or 10b according to embodiment 1 as a condenser or an evaporator.

Advantages of Embodiment 2

According to embodiment 2, the air-conditioning apparatus 100 includes a refrigerant cycle circuit in which the compressor 101, the condenser, the expansion device 104 and the evaporator are sequentially connected by pipes. The heat exchangers 10, 10a and 10b according to embodiment 1 are each used as the load-side heat exchanger 105 functioning as a condenser or an evaporator.

In this configuration, the heat exchangers 10, 10a and 10b which are formed and bent in angle and dimension with a high accuracy are each used as the condenser or the evaporator. As a result, the yield of products can be improved. In addition, a high-performance air-conditioning apparatus 100 can be provided.

REFERENCE SIGNS LIST

1 fin 1a through hole 2 heat transfer tube 3 bending portion 4 starting hole 4a vertex portion 4b boundary 4c boundary 4d boundary 4e boundary 4f boundary 5 cut 6 lower half 7 upper half 8 displacement allowable width 9 depth-variation allowable width 10 heat exchanger 10a heat exchanger 10b heat exchanger 11 fin prototype 20 heat-exchanger prototype 20a heat-exchanger prototype 20b heat-exchanger prototype 100 air-conditioning apparatus 101 compressor 102 four-way valve 103 heat-source-side heat exchanger 104 expansion device 105 load-side heat exchanger 106 heat-source-side fan 107 load-side fan 108 pipe 109 pipe 110 controller 111 controller

The invention claimed is:

1. A heat exchanger comprising:
a plurality of plate-shaped fins disposed at intervals; and
a plurality of heat transfer tubes inserted in through holes of the fins in a direction perpendicular to the fins,
the fins each including a starting hole which is formed therethrough and located adjacent ones of the through holes of the each fin, the starting hole capable of serving as a start point of bending of the each fin and having a vertex which is closer to a first edge of the each fin, the vertex having a minor angle facing a direction toward a second edge of the each fin which is located opposite to the first edge,
the each fin including a cut connecting the second edge of the each fin and a side of the starting hole which is located opposite to the vertex of the starting hole,
the starting hole having a displacement allowable width configured to allow displacement of the cut in a direction perpendicular to an extending direction of the cut, and a depth-variation allowable width configured to allow variation between lengths of respective ones of the cuts of the fins in the extending direction of the cuts,
the starting hole having as sides of a region having both the displacement allowable width and the depth-variation allowable width, a boundary which is located opposite to a portion of the each fin capable of being bent and the vertex, and which is located in a straight line perpendicular to the extending direction of the cut, and additional boundaries which extend by the displacement allowable width, and which are located in straight lines extending in the extending direction of the cut,
the each fin is capable of being bent at the vertex of the starting hole by opening the cut from the starting hole.

2. The heat exchanger of claim 1, wherein the vertex is located closer to the portion of the each fin capable of being bent than to a center line of the each fin which is perpendicular to the extending direction of the cut.

3. The heat exchanger of claim 1, wherein the fins are each formed to have a thickness which falls within a range of 90 μm to 110 μm.

4. The heat exchanger of claim 1, wherein the heat transfer tubes are arranged in line in a direction perpendicular to the extending direction of the cut.

5. The heat exchanger of claim 1, wherein the heat transfer tubes each have an outer diameter which falls within a range of 3.5 mm to 7.0 mm.

6. A refrigeration cycle apparatus comprising a refrigerant cycle circuit in which a compressor, a condenser, an expansion device and an evaporator are sequentially connected by pipes,
the heat exchanger of claim 1 being used as the condenser or the evaporator.

7. A method for manufacturing a heat exchanger including a plurality of plate-shaped fins disposed at intervals, and a plurality of heat transfer tubes disposed to be inserted into through holes of the fins in a direction perpendicular to the fins,
the method comprising:
a starting hole forming step of forming a starting hole between adjacent one of the through holes of each of the fins, the starting hole serving as a start point of bending of the each fin and having a vertex portion which has a minor angle at a bending portion of the each fin which is close to an edge thereof;
a heat-exchanger prototype forming step of forming a heat-exchanger prototype in which the heat transfer tubes are fixed to the fins;
a cut making step of making a cut in each of the fins of the heat-exchanger prototype, the cut connecting an other edge of the each fin and a side of the starting hole which is located opposite to the vertex portion of the starting hole; and
a bending step of bending the each fin in which the cut is made, at the vertex portion of the starting hole, by opening the cut from the starting hole,
the starting hole formed in the starting hole forming step having a displacement allowable width which is set to allow displacement of the cut in a direction perpendicular to an extending direction of the cut, and a depth-variation allowable width which is set to allow variation between lengths of cuts of the fins in the extending direction of the cuts,
the starting hole also having, prior to the bending step, as sides of a region having both the displacement allowable width and the depth-variation allowable width, a boundary which is located opposite to the bending portion of the each fin and the vertex portion, and which is located in a straight line perpendicular to the extending direction of the cut, and additional boundaries which extend by the displacement allowable width, and which are located in straight lines extending in the extending direction of the cut.

8. The method of claim 7, wherein the vertex portion is located closer to the bending portion than to a center line of the each fin which is perpendicular to the extending direction of the cut.

9. The method of claim 7, wherein the fins are each formed to have a thickness which falls within a range of 90 μm to 110 μm.

10. The method of claim 7, wherein the heat transfer tubes are arranged in line in a direction perpendicular to the extending direction of the cut.

11. The method of claim 7, wherein the heat transfer tubes each have an outer diameter which falls within a range of 3.5 mm to 7.0 mm.

* * * * *